April 23, 1968 L. CORRSIN ET AL 3,379,527
PHOTOCONDUCTIVE INSULATORS COMPRISING ACTIVATED SULFIDES, SELENIDES, AND SULFOSELENIDES OF CADMIUM
Filed Sept. 18, 1963 2 Sheets-Sheet 1

INVENTORS
LESTER CORRSIN
ARTHUR J. BEHRINGER
BY Stanley Z. Cole
ATTORNEY

PHOTOCONDUCTIVE INSULATORS COMPRISING ACTIVATED SULFIDES, SELENIDES, AND SULFOSELENIDES OF CADMIUM

Filed Sept. 18, 1963 2 Sheets-Sheet 2

INVENTOR.
LESTER CORRSIN
ARTHUR J. BEHRINGER
BY Stanley Z. Cole
ATTORNEY

United States Patent Office 3,379,527 Patented Apr. 23, 1968

3,379,527

PHOTOCONDUCTIVE INSULATORS COMPRISING ACTIVATED SULFIDES, SELENIDES, AND SULFOSELENIDES OF CADMIUM

Lester Corrsin, Penfield, and Arthur J. Behringer, Webster, N.Y., assignors to Xerox Corporation, Rochester, N.Y., a corporation of New York Filed Sept. 18, 1963, Ser. No. 309,655
17 Claims. (Cl. 96—1.5)

This invention relates in general to photosensitive members and in particular to structure including such members, to methods for the production and use of such photoconductors.

The photosensitive properties of cadmium sulfide, cadmium selenide and cadmium sulfoselenides have been known for some time and much time, effort and expense have gone into modifying and improving the properties of these materials for use in specific devices. When properly prepared, the photosensitive cadmium compounds referred to above may be termed photoconductive; that is to say they display a reduced resistance to electric current flow when they are exposed to light or other activating electromagnetic radiation, but when prepared by prior art techniques their dark resistivity is excessive for many purposes.

For many applications, the ideal photoconductive device is one which is a perfect insulator when it is not subjected to activating radiation such as light and is a perfect conductor when it is subjected to a high intensity of activating radiation. Actually the great majority of photoconductive devices behave as fairly high resistance conductors in the absence of activating radiation and as lower resistance conductors in the presence of activating radiation. In many cases, although it would be preferable that the photoconductor have a very high dark resistivity approaching that of a perfect insulator, relatively low dark resistivities on the order of $10^7$ to $10^9$ ohm-cm. may be tolerated as long as there is a high ratio between the light-exposed resistivity and the dark resistivity of the photoconductor. Thus, for example, although it would be better for ordinary photocells to have infinite dark resistivities so that no current would flow through them when they are not exposed to light, small amounts of current flow through them in their darkened condition are tolerable. This is so because they are generally used in circuits which contain other elements that will not respond to the small amounts of current flow but which only respond to or are triggered by the significantly higher amounts of current flow that pass through these photoconductors upon their exposure to light.

On the other hand, even in these applications it is better to have a photocell which has higher resistivity approaching that of a perfect insulator because then the cell may be used in conjunction with other circuit elements which are much more responsive to very small amounts of current, thus allowing for the fabrication of circuits which have higher overall sensitivity.

In addition, there are certain other photoconductor applications in which extremely high resistivities are virtually indispensable. Thus for example in xerography as that process is most generally practiced photoconductors having dark resistivities on the order of at least about $10^{13}$ ohm-cm. are required. The reason requiring photoconductors of such high dark resistivities becomes apparent after a short explanation of the most commonly used xerographic process. In the process as first described in U.S. Patent 2,297,691 to C. F. Carlson, a photoconductor is first given a uniform electrostatic charge over its surface and is then exposed to an image of activating electromagnetic radiation. A latent electrostatic image then forms on the photoconductor because the illuminated areas of the photoconductor become relatively conductive allowing the charge in those areas to be dissipated while charge in the non-illuminated areas is retained. This latent electrostatic image is then developed or made visible by the deposition of finely divided electroscopic marking material on the surface of the photoconductor which conforms to the pattern of the latest electrostatic image. The visible image may then be viewed or used in situ on the photoconductor or it may be transferred to a second surface as desired. It thus becomes obvious that the photoconductive film must have a sufficiently high dark resistivity to hold its initial charge in areas which are not exposed for at least as long a time as is required to expose and develop the photoconductor. In practice, it has been found that photoconductors having dark resistivities on the order of $10^{13}$ ohm-cm. or higher are required for this purpose. Since resistivities of this level are in the range normally associated with insulators, photoconductors having dark resistivities of about $10^{13}$ ohm-cm. or higher may properly be referred to as photoconductive insulators.

Although vitreous selenium photoconductive insulators have been used with highly satisfactory results in the xerographic process, a constant search has gone on for improved materials which have the requisite dark resistivity along with increased sensitivity, wider spectral response and other desirable properties.

Another elusive property much sought after in the art has been quantum gain in photoconductive systems. Stated in an oversimplified way, quantum gain for a photoconductor is a measure of its effectiveness in converting absorbed photons into conductivity. More precisely, quantum gain is defined as the number of holes and electrons transported across the photoconductor under an applied field per absorbed photon. Although quantum gain may and does in most instances fall below 1, there is no true gain as that term is understood in the electronics arts until it exceeds 1, above which point it is also referred to as multiplication. Obviously, it is highly desirable to have photoconductors which not only utilize impinging short wave length photons more efficiently but also exhibit panchromatic response so that they will be more sensitive to daylight or incandescent light exposure.

Accordingly, it is an object of this invention to define a novel photoconductive element.

It is a further object of this invention to define a novel method for the production of the aforementioned photoconductive element.

It is also an object of this invention to define a novel photocell and a method for its production.

A further object of this invention is to define a novel and improved xerographic plate.

It is still another object of this invention to define imaging systems utilizing the aforementioned novel photoconductive element which are capable of producing multiplication in the system.

The above and still further objects, features, and advantages of the present invention will become apparent upon consideration of the following detailed disclosure of specific embodiments of the invention, especially when taken in conjunction with the accompanying drawings wherein.

Figure 1:
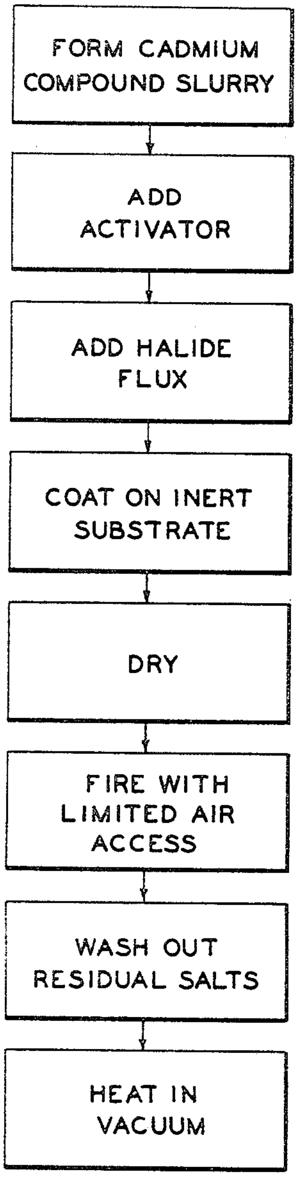
FIG. 1 is a block flow diagram of the process of producing the photoconductive element according to this invention.

Referring now to FIG. 1 and the first process step indicated therein, a well dispersed aqueous suspension or slurry of the selected cadmium compound is first formed. The powder should be of luminescent grade (high purity) and preferably less than about 50 microns in size. Although the powder may be selected from the group consisting of the sulfides, selenides and sulfoselenides of cadmium, the cadmium sulfide powder will be referred to for purposes of this description.

Method I

Generally, the slurry is formed by adding about 0.25 to 0.50 gram of cadmium sulfide powder per milliliter of deionized water and agitating continuously with an inert stirring rod for ½ to 2 hours. Although this concentration of powder to water is not critical to the process, it has been found that concentrations of from 0.25 to 0.35 gram of solids per ml. of the final slurry prior to coating yield a slurry which facilitates the later coating step. The activating material is then added to the slurry. This may most easily be accomplished by adding an aqueous solution of the activating compound which may for example be cupric chloride to the slurry, a drop at a time, while stirring so that the activating compound uniformly coats the cadmium sulfide particles by a chemical exchange reaction. Mild digestion of slurry at 95° C. for about one hour with stirring enhances the exchange reaction but is not necessary. The amount of activator to be added will depend upon the particular cadmium compound utilized. Thus, for example, the copper concentration which produces optimum results in cadmium sulfide film is about 0.05% while the optimum in pure cadmium selenide is nearer 0.005% and the optimum for the sulfoselenide films up to 50 mole percent selenide is .05% and above that is intermediate between the above two concentrations. Accordingly, the amount of activator to be added to the slurry will be calculated according to the composition of the cadmium compound utilized as the basic slurry component. It is to be noted that although the figures given above for activator proportions produce optimum results with respect to sensitivity, panchromatic response and charge holding properties, these exact proportions are not critical so that the percentage of co-activator in pure cadmium sulfide may range from about 0.005% to about 0.5% in pure cadmium selenide may range from about 0.0001% to about 0.1%, and in sulfoselenide films may range between the aforementioned ranges while still increasing the panchromaticity and sensitivity of the layers. Silver, gold or manganese ions may also be used as the activator. After addition of the activator, a halide flux is then dissolved into the slurry. This flux acts as a solvent for the photoconductor during the later firing operation. Although any material which dissolves the photoconductive powder at the firing temperature may be used as the flux, cadmium chloride, cadmium bromide and cadmium iodide are specific materials which are effective for this purpose. Again the percentage of flux is not highly critical and cadmium chloride in amounts from 2 to 4% by weight of the cadmium sulfide in the slurry have been found effective. The flux should be dissolved into the slurry with stirring for uniform distribution, or may be added in the form of an aqueous solution. Following addition of the flux, the slurry is distributed over a substrate which is chemically inert to the slurry components and which can withstand the firing temperatures. Suitable substrates include Pyrex and Vycor brand glasses (brand names of Corning Glass Works for temperature resistant borosilicate glasses), fused silica and other temperature resistant materials. Depending upon the final utilization of the photoconductive element, the substrate may be either transparent or opaque to the actinic radiation which is to be used to activate the photoconductor and if desired may include a thin transparent conductive coating such as tin oxide over its surface for later use as an electrode. Borosilicate glasses having such tin oxide coatings, are sold by Corning Glass Works, Corning, N.Y. under the trade name E.C. coated Pyrex. Spectrographic analysis of CdS films sintered onto tin oxide coated Pyrex coatings showed no trace amounts of Sn impurity indicating the relative chemical inertness of the tin oxide. The slurry is spread evenly over the surface of the substrate with an inert spreading instrument usch as a polyethylene spatula and then carefully dried in a level position so as to maintain surface uniformity and thickness, which may be accelerated by the application of a heat source such as an infrared lamp. The film may then be further dried for about 2 hours at 60° C. Following drying, the slurry film is fired with a controlled limited access of air. This may be accomplished by firing the slurry film in a covered but unsealed container slightly larger than the combined size of the film and substrate. Firing times and temperatures are from about 525° C. to about 600° C. for about 5 to 30 minutes (depending upon temperature) have been found effective in producing uniform sintered films with good adherence to the substrate. A Pyrex cover plate was used over the film during the firing and lowered into direct contact with the film during cooling. This prevented film peeling during cooling which might be produced by differences in expansion coefficients between the glass and CdS.

Two additional methods for the preparation of the slurry are described below:

Method II

In this procedure an aqueous cadmium compound slurry, 1 gm. solids per ml. slurry, is blended with the co-activator and the flux utilizing ballmilling techniques. Although spectrographic analysis of the solids, treated in this manner, show traces of Si and B from the porcelain equipment, these impurities apparently are not detrimental to the ultimate photosensitivity of the material. Further, the addition of 1 to 5% daxad-11, a dispersing agent consisting of a polymerized sodium salt of alkyl aryl sulfonic acid, produced by Dewey and Almy Chem. Co., Cambridge, Mass., to the slurry as a dispersion agent apparently has no detrimental effects either. This method is useful where dispersion of agglomerates and a reduction of particle size is required prior to the preparation of the film. The following detailed procedure serves to illustrate the technique and does not limit the method.

About 10.0 gm. of CdS powder are mechanically blended using a magnetic stirrer with 9 ml. deionized water. The Daxad-11 dispersion agent may or may not be introduced into the slurry solution; when added, it constitutes approximately 1 to 5% dry weight of CdS. An aqueous $CuCl_2$, $CdCl_2$ solution is introduced dropwise into the suspension with continuous stirring for an additional 30 minutes. The quantities of the coactivator and flux may vary as described above in the first method of preparation. The slurry is then transferred to a ½ pint size, porcelain jar containing 25 to 30½" diameter size porcelain balls. The total volume of slurry is approximately 10.0 ml. at this point in the procedure. The jar is sealed up and system ballmilled. An adequate period for ballmilling may vary from a few hours to several days and will depend markedly on the degree of de-agglomeration and the reduction of particle size that which can be achieved under these conditions. The slurry is finally transferred to a screw cap jar and its concentration adjusted from 0.25 to 0.35 gm. CdS per milliliter of slurry.

Method III

In this procedure the initial powder has already been made photoconductive by another technique such as the pyrolytic method described by Busanovich and Thomsen. (U.S Patent 2,876,202). The powder already contains a co-activator, such as Cu or Au or Ag, and a substantial amount of an activator such as Cl, Br, I, In, or Ga. The powder is ballmilled to form the slurry in an analogous manner described in aforementioned Method II without introduction of more co-activators.

The above-described process steps result in the formation of a uniform slightly porous, polycrystalline, light sensitized, sintered cadmium sulfide with good adherence to its substrate. Once the sintered film has been allowed to cool, it is washed in purified, deionized water to remove any residual salts. Washing in successive baths is repeated until no contaminating salt ions are detectable in the last water bath. Special care should be given to the preparation of the water baths to assure that they are essentially free of dissolved salts. Following the last water bath, the sintered film is given a final rinse in acetone which serves to remove the water in solution and the film is then allowed to dry. This washing procedue to remove residual salts which have not been incorporated into the cadmium sulfide crystal lattices has been found in most instances to increase the dark resistivity of the sintered film into the $10^{14}$ ohm-cm. range for the first time. This dark resistivity is at least $10^3$ ohm-cm. higher than the dark resistivity achieved by the prior art process. The high level of dark resistivity was clearly indicated by the fact that these films could be operated in the ordinary xerographic mode without excessive dark decay. That is to say, the sintered films after this processing step were capable of holding charge through the charging, exposing and developing steps of the xerographic process. After extensive testing of the above described process including the washing step, it was found that the washing was not absolutely consistent in producing sintered films with dark resistivities in the $10^{14}$ ohm-cm. range. It was later found, however, that vacuum heat treatment of the sintered films for periods from one hour to one day at temperatutres for 20° C. to 150° C. assured the production of sintered films in the $10^{14}$ ohm-cm. dark resistivity range in all instances regardless of whether the film had previously been just below this dark resistivity range or significantly below it after the washing step. Vacuum pressures in approximately the range from $2.5\times10^{-3}$ to about $10^{-5}$ mm. of mercury were required for this step. The ranges given for the vacuum heat treatment, although not absolutely critical to the operation of the process should be followed since vacuum treatment at higher temperatures on the order of 250° C. were found to significantly lower the dark resistivity even when it was initially very high after the washing procedure. Degradation of dark resistivity under vacuum treatment at higher temperatures (in the 250° C. range) was understandable because the heat treatment at this temperature of cadmium sulfide in a vacuum is believed to cause the formation of sulfur vacancies in the crystal lattices which act as donor centers. Chlorine may diffuse out of the film resulting in the formation of "effective" sulfur vacancies and increasing conductivity. Although there appears to be no ready theoretical explanation for the effect of the vacuum heat treatment at the described temperatures and pressures, empirical results have shown the process to be highly effective while heat treatment in air at the same temperatures has been shown to have virtually no effect on dark resistivity.

Figure 2:
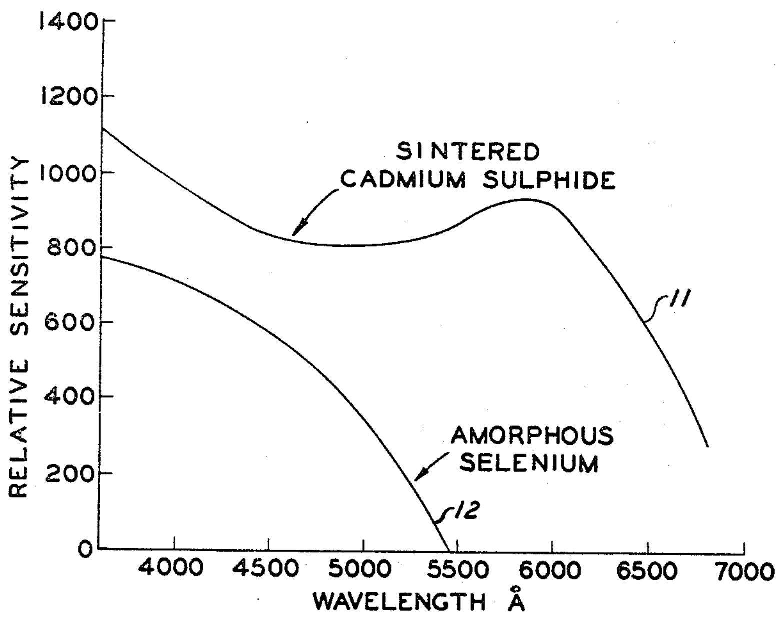
FIG. 2 is a graph comparing the spectral sensitivity of sintered cadmium sulfide, the photoconductive film made in accordance with this invention with that of amorphous selenium, both measured in xerographic plate configuration.

A sintered cadmium sulfide photoconductive insulating film made according to the process described immediately above, and including a conductive E.C. glass (a tradename for glass coated with a thin transparent conductive tin oxide layer) substrate was tested for spectral sensitivity in the conventional xerographic mode of operation. Not only did these tests indicate that the sintered cadmium sulfide photoconductive insulating film has a sufficiently high dark resistivity to accept and retain negative charge for periods necessary for xerographic operation, but that in fact that it has extended spectral response and increased overall sensitivity as compared with the best commercially available photoconductive insulators useable in the xerographic process. Thus, in FIG. 2 which is a graph of reltaive sensitivity at different wave lengths of visible light (the sintered films of this invention are compared with amorphous selenium, the best commercial photoconductive insulator). Cure 12 indicates that amorphous selenium is quite sensitive in the violet from about 3800 to 4400 angstrom units. In passing through the blue from about 4400 to 4800 angstrom units, amorphous selenium also remains fairly sensitive, however as indicated in the graph sensitivity has already dropped off by about ½ to about 400 on the relative sensitivity scale at the top end of the blue and as it enters the low end of the green above 4800 angstrom units sensitivity falls off fairly rapidly with virtually no response above 5500 angstrom units. As indicated by curve 11 on the same graph the sintered cadmium sulfide made as described above had higher sensitivity at every wave length of visible light to which amorphous selenium is sensitive and furthermore has extended spectral response above 6700 angstrom units well into the red. In fact the cadmium sulfide has a sensitivity at 6700 angstrom units equal to that of amorphous selenium at about 4800 angstrom units. The result is that the sintered layer made according to this invention has a photographic speed over 4 times as high as the selenium in simulated daylight illumination, or fifty times in incandescent light (2600° K.). Furthermore the sintered cadmium sulfide photoconductive insulator of this invention has been shown to have significantly improved spectral response as compared to activated sintered cadmium sulfide photoconductors known in the prior art. While these prior art sintered cadmium sulfide photoconductors have shown a very sharp fall off in spectral response below 4800 angstrom units, the cadmium sulfide films made according to this invention have not only maintained their spectral response below 4800 angstrom units but have, in fact, shown increased spectral response below 4800 angstrom units.

Figure 3:
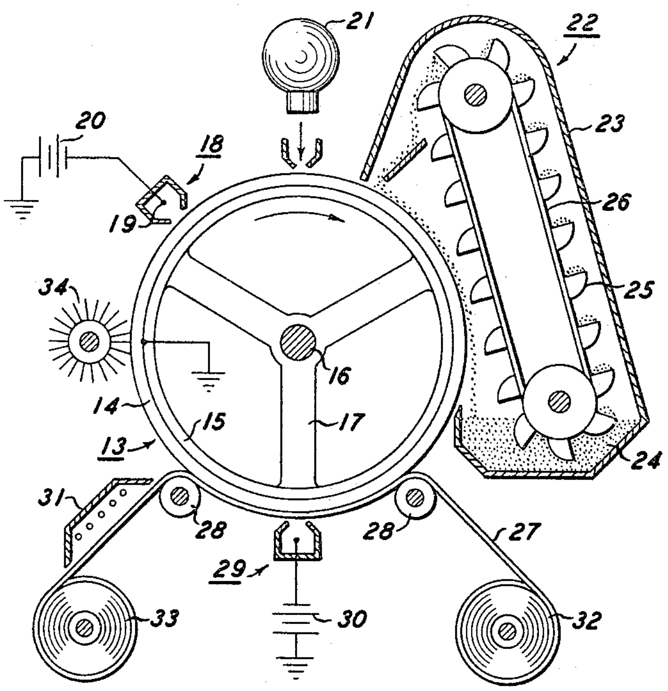
FIG. 3 is a side-sectional view of a continuous xerographic copying apparatus utilizing the photoconductive insulating film made by the process described in FIG. 1.

As described above, the sintered photoconductive insulating film may include not only cadmium sulfide but cadmium selenide so as to form cadmium sulfoselinide. Amounts on the order of about 15 mole percent selenide in the cadmium sulfoselenide have the general effect of increasing the spectral sensitivity above 5000 angstrom units as compared with the sulfide alone and of shifting the response curve into the higher wave lengths. With increases up to about 50 mole percent of selenide in the sulfoselenide, spectral sensitivity tends to increase significantly at all wave lengths to which the cadmium sulfide alone is sensitive and the spectral response curve tends to extend even further into the higher wave lengths. Increasing the mole percentage of selenide in the sulfoselenide above 50% does not further increase the overall sensitivity of the film but merely shifts it further into the longer wave lengths so that there is even some response in these films to light of wave lengths in the vicinity of 9500 angstrom units. At the same time increasing mole percentages of the selenide over 50% tends to significantly degrade the dark resistivity of the sulfoselenide. Where the plates made according to this invention are utilized to hold charge it is preferable to charge them negatively since they have been found superior with that polarity of charging. The FIG. 3 apparatus is made up of a xerographic drum 13 comprising a sintered photoconductive insulating layer 14 made according to the above described process on an electrically grounded relatively conductive (preferably with a resistivity less than about $10^8$ ohm-cm.) backing 15. The backing 15 is generally included for the purpose of supporting the photoconductive layer 14 and may in this instance consist of any material which is chemically inert to the sintered film at its firing temperature, and might for example comprise the tin oxide coated Pyrex glass described above above in connection with the fabrication process. If a tin oxide layer is used, this layer is grounded as shown in the figure. This base 15 is journaled for rotation about a central axis 16 by three radial arms 17 which support the base, although any other mechanical arrangement for rotating the cylinder may be utilized.

In operation, the plate is first negatively charged with a corona generating unit 18 which comprises a shielded wire filament 19 connected to a source of high potential 20. This unit operates on the corona discharge technique as described in U.S. Patents 2,588,699 to Carlson and 2,777,957 to Walkup. Essentially, the technique consists of spacing a thin wire filament slightly from the surface of the photoconductive insulating layer while a conductive base below the layer is connected to ground while applying a high potential to the filament so that a corona discharge occurs between the filament and the photoconductive insulator thus serving to deposit charge on its surface and raise its potential with respect to ground. The photoconductive insulating layer along with its conductive grounded base are collectively referred to in the art as a xerographic plate regardless of the shape which they may take. This xerographic plate may also be charged by other equivalent techniques known in the art such as induction charging as described in U.S. Patent 2,934,619 to Walkup. The charging process is generally carried out in darkness since after charging the xerographic plate is sensitive and ready for exposure. Following charging, the xerographic plate is rotated past an exposure station which may for example comprise a slit projector 21 which projects successive portions of the original to be reproduced on the sensitized xerographic drum as it rotates past the projector.

Once the xerographic plate has been charged and exposed it continues in its path of rotation past a developing station 22. Development may be carried out utilizing any one of the conventional xerographic developing techniques known in the art. A commercially utilized cascade type developing unit is shown for purposes of illustration. This cascade type unit includes an outer container or cover 23 with a trough at its bottom containing a supply of developing material 24. This developing material is picked up from the bottom of the container and dumped or cascaded over the drum surface by a number of buckets 25 on an endless driven conveyor belt 26. This development technique which is more fully described in U.S. Patent 2,618,552 and U.S. Patent 2,618,551 utilizes a two-element developing mixture including finely divided colored marking particles or toner and grossly larger carrier beads. Carrier beads serve both to maintain the fine toner deagglomerated and to charge it by virtue of the relative positions of the toner and carrier material in the triboelectric series. When the carrier beads with toner particles clinging to them are cascaded over the drum surface, the electrostatic field from the charge pattern on the drum pulls toner particles off the carrier beads serving to develop the image. The carrier beads along with any toner particles not used to develop the image then fall back into the bottom of the container 23 and the developed image continues around in its path of rotation until it comes into contact with a copy web 27 which is pressed up against the drum surface by two idle rollers 28 so that the web moves at the same speed as the periphery of the drum. A transfer unit 29 is placed behind the web and spaced slightly from it between rollers 28. This unit is similar in nature to the plate charging mechanism 18 and also operates on the corona discharge principle. The transfer device is also connected to a source of high potential 30 of the same polarity as that employed in the charging device so that it deposits charge on the back of web 27 which is of the same polarity as the charge initially placed on the surface of the photoconductive insulating layer of the xerographic plate by charging unit 18. It should also be noted at this point that other transfer techniques known in the art may be utilized with the invention. For exampe, a roller connected to a high potential source opposite in polarity to the toner particles may be placed immediately behind the copy web or the copy web itself may be adhesive to the toner particles. After transfer of the toner image to web 27, the web moves beneath a fixing unit 31 which serves to fuse or permanently fix the toner image to the web. In this case, a resistance type heating unit is illustrated, however other techniques also known in the art may be utilized including the subjection of the toner image to a solvent vapor or the spraying of the toner image on web 27 with an adhesive overcoating. The web, having initially come from a supply roll 32 may be rewound on a second roll 33 for later use, fed directly to a slitter or utilized in other ways. After passing the transfer station, the drum continues in its rotation and moves into contact with a cleaning brush 34 which removes any residual toner which may have been left behind by the transfer operation, preparing the drum for a new cycle of operation.

In view of the highly desirable properties of the above described photoconductive insulating films, these films may be used to advantage in photocells as well as in many other photoconductive devices of both simple and complex construction including vidicons, light amplifiers and the like. A simple photocell may be formed by putting down the sintered photoconductive insulating film of this invention on a substrate with a conductive overcoating which is chemically inert to the sintered film at the firing temperature by providing a gap in the conductive layer. Two electrically separated electrodes connected to different sections of the photoconductive film are thus provided and the electric field of the photocell is applied across the photoconductive section which lies over the gap between the two electrodes. In a somewhat more sophisticated technique, instead of just forming a gap between two portions of the conductive coating on the photocell substrate, the conductive electrodes are laid down on the substrate as a series of interdigitated fingers with each electrode having a plurality of fingers extending between the fingers of the opposite electrode. It has also been found that a much superior photocell is formed when electrodes can be applied to both sides of the sintered film so that the electric field is applied through the film in a concentrated manner. Although the base electrode may be applied without much difficulty by laying it down as a conductive layer over the substrate prior to the formation of the sintered film above it, significant difficulties have been encountered in attempting to apply a good electrically conductive electrode over the top surface of the sintered film because of its somewhat porous nature. To achieve good results with such an electroded structure, it is preferable to have intimate contact between the electrode and the sintered film. Thus although electrodes may be put down on the surface of the sintered film by pressing a conductor up against the surface of the film or by coating the film with pastes of resins including powdered conductors, these types of electrodes do not provide the desirable degree of intimate contact with the film and have inherent faults such as failure to form good conductive paths and tendency to contaminate the contact. A well known technique for forming good electrodes in intimate contact with a layer is to evaporate a layer of a conductive metal such as copper, silver, gold or the like directly onto the layer. It has been found, however, that this evaporation technique may not be employed with the sintered film of the instant invention, since the evaporated conductive material apparently tends to penetrate into these porous films causing extremely high dark currents through the films and even short-circuits them on occasion. Copper, aluminum and indium were all shown to have this effect to some extent although they do not always cause it.

Figure 4:
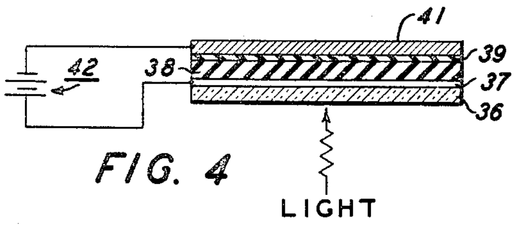
FIG. 4 is a side-sectional view of a novel sandwich photocell utilizing a photoconductive insulator made according to the process of FIG. 1.
Figure 5:
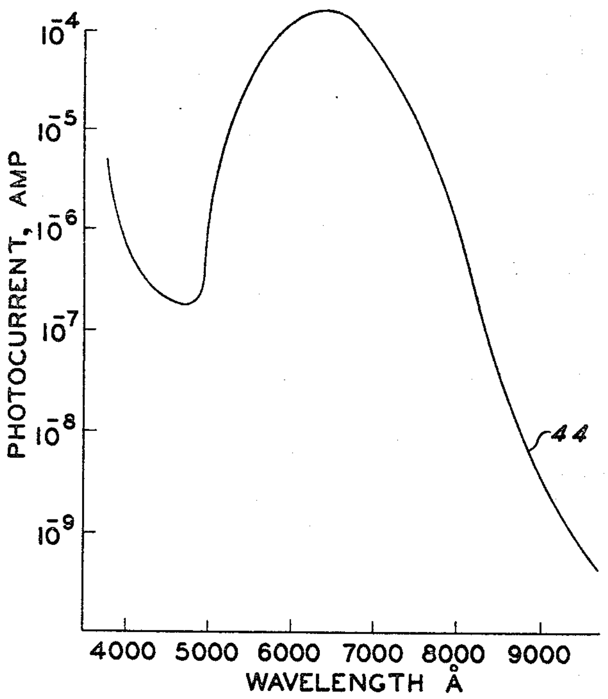
FIG. 5 is a graph of the spectral sensitivity of the sandwich cell illustrated in FIG. 4.

This problem of photocell fabrication has been solved by the photocell structure of FIG. 4 which include a transparent substrate 36 which may for example be Pyrex glass under a thin transparent conductive layer 37 such as tin oxide. The sintered film 38 is then formed over the two substrate layers by the technique described above. A very thin insulating or blocking layer 39 is then evaporated over the upper surface of the sintered photoconductive insulating film. This blocking layer may for example be made of silicon monoxide, polyvinyl chloride or zinc sulfide and should be very thin on the order of about 750–2000 angstrom units. A conductive electrode 31 such as aluminum, copper, silver, gold or the like is then evaporated onto the photocell over the blocking layer 39. In operation, a potential source such as 42 is connected to layers 37 and 41 which act as electrodes to apply potential across the film. The use of this very thin blocking layer has been shown to prevent the penetration of any of the evaporated electrode material into the sintered film and because it is laid down in such a thin layer, it permits the carriers to move from the cadmium sulfide to the electrode. As is indicated by the arrow in FIG. 4, exposure to the photocell may be made through its underside because of the transparent nature of the substrate layers 36 and 37. Curve 44 in FIG. 5 shows the enhanced sensitivity and extended spectral response of the FIG. 4 photocell.

Figure 6:
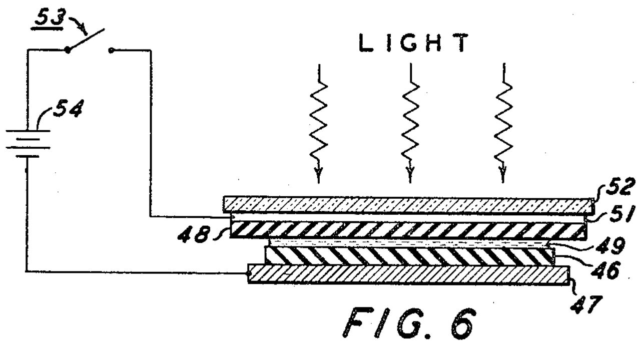
FIG. 6 is a side-sectional view of an imaging system utilizing the photoconductive insulator made according to the FIG. 1 process which is capable of quantum gain.

In FIG. 6 there is illustrated an imaging system utilizing the sintered film of this invention which is capable of achieving quantum gain. This system includes the sintered film 46 on a conductive substrate 47. The free surface of the sintered film 46 contacts a layer of an insulating material 48 such as a plastic through a thin oil film 49. Beneath the insulating layer 48 there is disposed a thin transparent conductive layer 51 which may for example be fabricated of copper iodide or tin oxide. A transparent supporting substrate 52 may also be included for layers 51 and 48 if desired or necessary. This layer 52 may, for example, be glass or a thin (¼ to 1 mil) flexible layer of polyethylene terephthalate which is sold by E. I. du Pont and Company under the tradename Mylar. Such a supporting substrate is generally used because it faciliates the fabrication of the thin transparent conductive layer 51 and acts as a support for the overall electrode structure made up of elements 48–52. A circuit containing a switch 53 and a potential source 54 in series is connected across the conductive layers 47 and 51 so that a potential is applied across these conductive layers when the switch is closed. A shutter operating relay or other shutter operating mechanism may also be connected in this circuit so that simultaneous exposure and voltage application may be obtained. Exposure may be made through transparent layers 48, 51 and 52. The application of the potential source serves to create a field across the "sandwich" formed by the various layers described above. Charge carriers liberated by the action of light on the photoconductor are carried through the oil film by the applied field and deposited on the plastic layer 48 in image configuration. Charge transfer from a photoconductor to an insulating film is more fully described in U.S. Patents 2,937,943 and 2,825,814 to Walkup. Very thin films of insulating liquids such as oils may be employed to advantage in the system of this invention in the gap between the photoconductor 46 and the insulating layer 48. Charge may be transferred through this type of layer because although these materials are highly insulating in bulk form, they will transport charge normal to their surfaces in thin films under the action of high fields. Insulating liquids with a high dielectric strength including silicone oils such as Dow Corning 200 fluid (dimethyl polysiloxane) have proved to be suitable for use in the system. If exposure of the system is made from the direction indicated in FIG. 6, layers 48, 49, 51 and 52 must all be transparent. In this instance, layer 52 may comprise glass, polyethylene terephthalate or the like and layer 51 may be any one of the transparent conductive layers known in the art such as tin oxide, copper iodide or the like. The only requirements for layer 48 are that it be transparent and sufficiently insulating to hold the charge pattern transferred to it during the imaging process for sufficiently long periods so that it may be utilized in a development technique. Illustratively, layer 48 may comprise polyvinyl chloride. It also should be noted that exposure need not necessarily be made from the direction shown in FIG. 6 and that, if desired may be made from the opposite side of the sandwich formed by layers 47–52 by merely making the plate base 47 a transparent conductive member, in which case layers 48, 51 and 52 need not be transparent. This may be accomplished by substituting Nesa glass for conductive layer 47. As explained above, Nesa glass comprises a thin transparent conductive layer of tin oxide on a glass base and would in this instance be placed with the tin oxide layer facing the cadmium sulfide photoconductive layer 46. In fact, the layers on both sides of the photoconductive film 46 may be transparent. They both may also be opaque when used in a system in which the opaque layers are transparent to the radiation. X-rays, for example, will readily pass through layers which are opaque to light radiation.

Quantum gain was achieved in both the FIG. 4 and FIG. 6 systems; however, significantly higher gains were achieved in the FIG. 4 system. It is believed that this discrepancy is explained by the fact that the imaging charge collection scheme of FIG. 6 involves capacitive contact or coupling with the photoconductor while the FIG. 4 system involves direct contact and further because charge accumulates on insulating layer 48 over electrode 51 of the FIG. 6 apparatus during its operation thus lowering the field across the photoconductor whereas in the FIG. 4 apparatus, the electric field across the photoconductor is constant during operation. These conclusions would seem to be supported by the fact that the quantum efficiency of the FIG. 6 charge collection device tended to increase as the coupling capacitance across the electrode was increased. It is therefore highly desirable that this capacitance be kept as high as possible by using thin layers with high dielectric constants in the space between the electrodes. Furthermore, it was found that in both the FIG. 4 and FIG. 6 apparatus, the use of a uniform light exposure or "bias" exposure prior to or during the application of potential enhanced the photoconductor response and permitted quantum efficiencies greater than 1 (quantum gain) to be observed for pulses and light exposures as short as $\frac{1}{25}$ of a second. Thus, for example with a two-micron thick polyvinyl chloride charge collecting layer and a potential of 350 volts applied across the electrodes 47 and 51, quantum efficiencies in excess of 1 were observed at light intensities of $4 \times 10^{11}$ photons/cm.$^2$/second while pre-exposure to a bias light increased these quantum efficiencies. In another test, bias lighting with an intensity of $10^{12}$ photons/cm.$^2$/second when continued for two minutes and turned off just prior to pulsing and exposure with $\frac{1}{25}$ second exposures and 500 volts applied potential showed quantum gain in excess of 1 with the FIG. 6 imaging system. Although gains as high as 18 were achieved with the photocell system of FIG. 4, light bias also proved to be a very important factor in stimulating useful gain at exposures of $5 \times 10^{10}$ photons/cm.$^2$/second and less with this structure. In fact, in two tests, under the same condition (75 volts applied, $\frac{1}{25}$ of a second exposure) an increase in the bias light intensity from $10^{10}$ photons/cm.$^2$/second to $10^{11}$ photons/cm.$^2$/second produced an increase in gain from 1.5 to 7. Corresponding increases in gain with increased bias light intensity were also shown for different values of applied potential in the electroded structure. It is to be noted, however, that in the charge collecting system of FIG. 6 high capacitance had the most significant effect on gain achieved, so that when the insulating charge collecting layer 48 was reduced to a ½ micron layer of polyvinyl chloride, system quantum gain was raised to 3.9. As was the case with the electroded structure of FIG. 4, the FIG. 6 charge collecting apparatus showed enhanced photoconductor response when the cadmium sulfide layer was impregnated with polyvinyl chloride from an organic solution.

Once the charge pattern has been transferred to insulating layer 48 in the FIG. 6 system, it may be separated and utilized in a number of different fashions. For example, it may be used as a memory system which is capable of being "readout" with an electrometer or it may be developed with any one of the many xerographic developing techniques known in the art. For example, it may be developed by cascade development as described in U.S. Patents 2,618,551 and 2,618,552 or by powder cloud development as described in U.S. Patents 2,727,304 and 2,918,900 among others. In these well known xerographic developing techniques, the electrostatic charge pattern on insulating layer 48 is made visible by the deposition on this layer of colored electroscopic particles which make the image directly visible. Another technique recently disclosed by Gundlach and Claus in the January-February 1963 issue of the Journal of Photographic Science and Engineering in an article entitled "A Cyclic Xerographic Method Based on Frost Deformation" is particularly suitable to the development of the charge pattern on layer 48. This method, called Frost, is unique in that the presence of charge on an area of the plastic film when it is softened causes that area to be deformed to yield a fine grained ripple or dimpling of the surface. When the plastic is softened by heat or solvent vapor, the viscosity of the film decreases to a point where charge repulsion overcomes the surface tension forces of the plastic and the rippling forms as the plastic attempts to increase its surface area. Because of the ridges and valleys or dimples formed on the surface of the plastic, it takes on a "frosted" appearance which in contrast to the glossy unaffected portions of the plastic becomes a diffusely reflecting or light scattering surface. Not only does this developing technique require no developing materials in addition to the charge collecting electrode, but it also has an inherent capability for continuous tone reproduction because this frosting occurs in the center as well as at the edges of extended charged areas in contradistinction to many prior art xerographic and thermoplastic deformation techniques which only develop charge gradients. It is thus possible to develop the polyvinyl chloride charge collecting layer 48 of the FIG. 6 apparatus once the charge pattern has been deposited on it by merely softening the plastic layer until a frost pattern appears. Other insulating thermoplastic materials may also be used in this frost development technique provided they are capable of forming frost images. Other suitable exemplary materials include a low molecular weight polystyrene sold under the tradename of Picolastic A–50 by the Pennsylvania Industrial Chemical Co. of Clairton, Pa. and Staybelite Ester–10, a partially hydrogenated rosin ester sold by the Hercules Powder Company of Wilmington, Del. Reference is made to U.S. patent application S.N. 193,277 for a more complete and detailed disclosure of the frost process and suitable materials.

What is claimed is:

1. A method for producing a sintered photoconductive insulating layer comprising, forming a layer including particles of a compound selected from the group consisting of the sulfides, selenides, and sulfoselenides of cadmium, said layer having incorporated therein coactivating proportions of a halide and an element selected from the group consisting of copper, silver, gold and manganese firing said layer in a restricted volume of air to form a slightly porous polycrystalline sintered layer of said cadmium compound, washing said sintered layer in deionized water baths and allowing said sintered layer to dry.

2. A method according to claim 1 further including rinsing said washed sintered film in a dehydrating agent which is not reactive with said cadmium compound prior to drying.

3. A method according to claim 1 further including rinsing said washed sintered layer in acetone prior to drying.

4. A method according to claim 1 further including subjecting said sintered film to a vacuum of from about $2.5\times10^{-3}$ to about $10^{-5}$ mm. of mercury at temperatures from about 20° C. to about 150° C. for a period on the order of at least one hour.

5. A method according to claim 2 further including subjecting said sintered film to a vacuum of from about $2.5\times10^{-3}$ to about $10^{-5}$ mm. of mercury at temperatures from about 20° C. to about 150° C. for a period on the order of at least one hour.

6. A method according to claim 3 further including subjecting said sintered film to a vacuum of from about $2.5\times10^{-3}$ to about $10^{-5}$ mm. of mercury at temperatures from about 20° C. to about 150° C. for a period on the order of at least one hour.

7. A photoconductive insulating film made according to the method of claim 4.

8. A photoconductive insulating layer according to claim 7 in which said photoconductive insulating layer is deposited upon a conductive substrate.

9. A method for producing a sintered photoconductive insulating layer comprising, forming a water slurry of a compound selected from the group of the sulfides, selenides and sulfoselenides of cadmium, incorporating activator proportions of a halide and activator proportions of an element selected from the group consisting of copper, silver, gold and manganese into said slurry, incorporating a cadmium halide flux into said slurry, distributing said slurry over a chemically inert substrate, drying said slurry to form a film on said substrate, firing said film with limited air access at from about 550 to about 600° C. for about from 5 to about 30 minutes to sinter said film, washing said sintered film in deionized water baths until salt ions are no longer detected in the last bath, and subjecting said washed, sintered film to a vacuum of from about $2.5\times10^{-3}$ to about $10^{-5}$ mm. of mercury at temperatures from about 20° C. to about 150° C. for a period of at least about one hour.

10. A photocell comprising a deionized water washed, sintered layer of a compound selected from the group consisting of the sulfides, selenides and sulfoselenides of cadmium coactivated with activating proportions of a halide and a member of the group consisting of copper, silver, gold and manganese on a conductive substrate layer, said layer having been heated to from about 20° C. to about 150° C. for a period of at least about one hour under a vacuum of from about $2.5\times10^{-3}$ to about $10^{-5}$ mm. mercury after washing, said layer being coated on its side opposite said substrate with a layer of an insulating material on the order of from about 400 to about 2000 angstrom units thick, said insulating layer being overcoated with an electrode layer of a conductive material whereby an electrical potential may be applied across said photocell through said overevaporated electrode and said transparent conductive substrate, at least one of said conductive layers being transparent.

11. An imaging apparatus capable of quantum gain comprising a photoconductive insulating layer made according to the method of claim 4 on a first conductive substrate, a thin insulating layer on a second conductive substrate, at least one of said substrates being transparent, with the free surfaces of said photoconductive insulating layer and said insulating layer facing each other across a very thin layer of an insulating liquid, means to apply an electrical potential across said conductive substrates and means to expose said photoconductive insulating layer through said transparent substrate whereby an electrostatic charge pattern in the form of the exposed image is formed on said insulating layer.

12. An imaging apparatus according to claim 11 in which said insulating film and said insulating liquid have a combined thickness of less than about 3 microns.

13. A method of forming a latent electrostatic image on a thin insulating layer comprising placing a first conductive layer contiguous with the first side of an insulating layer and placing the other side of said insulating layer into contiguous relationship with a sitnered photoconductive insulating film made according to the method of claim 4 with a very thin film of an insulating liquid between said insulating film and said sintered photoconductive insulating film, placing a conductive transparent layer in contiguous relationship with the side of said sintered photoconductive insulating opposite said insulating layer, and applying an electrical potential across said conductive layers while exposing said photoconductive insulating layer to an image of actinic electromagnetic radiation through said conductive transparent layer whereby a charge pattern in the form of said image is deposited upon said insulating layer.

14. A method according to claim 13 further including separating said insulating layer from said photoconductive insulating film after said charge pattern has been formed, softening said insulating layer with said charge pattern thereon until a frost image apears on its surface and then rehardening said insulating layer whereby said frost image is formed on said insualting layer.

15. A method according to claim 14 further including separating said insulating layer from said photoconductive insulating film and developing the latent charge pattern on said insulating layer by depositing finely divided, electroscopic, marking material thereon.

16. A xerographic plate comprising a water washed, sintered layer of a compound selected from the group consisting of the sulfides, selenides and sulfoselenides of cadmium coactivated with activating proportions of a halide and a member selected from the group of copper, silver, gold and manganese, said layer having been heated to from about 20° C. to about 150° C. for a period of at least about one hour under a vacuum of from about $2.5 \times 10^{-3}$ to about $10^{-5}$ mm. of mercury after washing, said sintered layer being deposited on a relatively conductive substrate.

17. A xerographic plate comprising a water washed, sintered layer of a compound selected from the group consisting of the sulfides, selenides and sulfoselenides of cadmium coactivated with activating proportions of a halide and copper, said layer having been heated to from about 20° C. to about 150° C. for a period of at least about one hour under a vacuum of from about $2.5 \times 10^{-3}$ to about $10^{-5}$ mm. of mercury after washing, said sintered layer being deposited on a relatively conductive substrate.

References Cited

UNITED STATES PATENTS

| | | | |
|---|---|---|---|
| 2,765,385 | 10/1956 | Thomsen | 117—201 X |
| 2,876,202 | 3/1959 | Busanovich et al. | 252—501 |
| 2,880,119 | 3/1959 | Floyd | 117—201 |
| 2,908,594 | 10/1959 | Briggs | 117—201 |
| 2,975,052 | 3/1961 | Fotland et al. | 96—1 |
| 2,995,474 | 8/1961 | Pearlman | 96—1.5 |
| 3,037,941 | 6/1962 | Ranby et al. | 252—501 |
| 3,109,753 | 11/1963 | Cole | 117—201 |
| 3,196,011 | 7/1965 | Gunther et al. | 96—1.1 |
| 3,238,062 | 3/1966 | Sunners et al. | 117—201 |
| 3,238,150 | 3/1966 | Behringer et al. | 117—201 |

NORMAN G. TORCHIN, *Primary Examiner.*

C. E. VAN HORN, *Assistant Examiner.*